Dec. 23, 1969  R. A. BROWN  3,486,111
DECADE READOUT DEMAND REGISTER
Filed Feb. 21, 1966  2 Sheets-Sheet 1

INVENTOR.
Robert A. Brown
BY
Darbo, Robertson & Vandenburgh
Atty's

Dec. 23, 1969    R. A. BROWN    3,486,111
DECADE READOUT DEMAND REGISTER
Filed Feb. 21, 1966    2 Sheets-Sheet 2

ROBERT A. BROWN
INVENTOR.

BY
Darbo, Robertson & Vandenburgh

United States Patent Office 3,486,111
Patented Dec. 23, 1969

3,486,111
DECADE READOUT DEMAND REGISTER
Robert Alan Brown, Lafayette, Ind., assignor to Duncan Electric Company, Inc., a corporation of Indiana
Filed Feb. 21, 1966, Ser. No. 528,989
Int. Cl. G01r 19/16
U.S. Cl. 324—103                17 Claims

ABSTRACT OF THE DISCLOSURE

The apparaus is a demand meter employing a Geneva gear lost motion means for driving a decade register. The Geneva gear lost motion device is periodically reset with the aid of a Geneva gear lost motion zero finding device. The zero finding device on reaching zero declutches the reset mechanism.

---

This invention, of which this disclosure is offered for public dissemination if adequate patent protection is granted, relates to electricity demand meters. More particularly it relates to a thoroughly practical and relatively simple block interval maximum demand register providing a multiple dial (decade) readout for preciseness of readings over a wide range.

The cost of electrical energy to any given consumer depends not only on the total amount of energy consumed over a relatively long period of time, such as billing period of one month, but also upon the maximum rate of consumption, or the "demand," of the same consumer. The reasoning behind increasing cost per kilowatt hour on the basis of maximum demand is that the power companies must install equipment capable of handling the peak demand of their customers. Considerably more capital equipment is required to serve a consumer if his peak is high, than if he used the same total energy but with a lower peak.

The present invention is concerned with providing a new and improved block interval maximum demand register. According to well-known practice such a register is used for separately measuring the consumer's power demands over each of the consecutive "block intervals" (relatively short intervals of time, such as fifteen or thirty minutes). The total amount of power consumption (really energy used) for that one interval during the billing period for whch the demand was greatest in the "maximum demand" for billing purposes.

Until recent years, most commercial maximum demand indicators were in the form of a single sweephand moving along a scale of perhaps 180 to 300 degrees. It is obviously desirable, however, to provide maximum demand registers which utilize a plurality of readout pointers or dials which may be of decade relationship to read, for example, in terms of units, tens, and hundreds. This gives a wide range of power consumption values, even though the more sensitive pointer is sufficiently fast moving to provide all of the accuracy of reading desired.

During the first interval of a billing period, the maximum demand dials are driven by the meter from a "zero" position and advance in proportion to the quantity of electrical energy used. At the end of this interval of time, which is preset at some fixed duration, commonly fifteen or thirty minutes, these maximum demand dials rest at the maximum value they attained during the interval, and the driving mechanism therefor is then returned to its initial or starting position to start a new interval, a lost motion device permitting this return. For each succeeding interval, the drive for the maximum demand dials against advances from its zero position but initially merely takes up play in the lost motion mechanism and will not engage and advance the demand dials unless the demand for this interval exceeds the demand already indicated on the dials. Thus the indicated value is always the high for all intervals since the beginning of the billing period. At the end of the billing period, the meter reader notes and records the maximum demand indicated by the maximum demand dials, and he then returns the demand dials to zero to initiate the succeeding billing period.

The mechanisms, previously proposed or used, which attempt to accomplish the foregoing desirable results all have distinct disadvantages. A disadvantage of one such register (Swiss Patent 356,532) is the fact that it requires a complex drive, with a separate motor other than the meter disk, to avoid an excessive load on the meter disk. This register is reset to zero at the end of each interval by a spring, or alternatively, by a weight. Such a "bias" system tends to require this form of drive, because the bias (which has to be overpowered by the forward drive) must be fairly strong to be even tolerably dependable. The dependability of a motor driven reset is virtually not attainable. The same register also utilizes a zero finding drive mechanism which, by its very configuration, is likely to accumulate an undesirable amount of inaccuracy, at least with the snap action operation of its "bias" system. Another well-known register requires, in effect, a dual input drive mechanism, with disconnection and coincident-type reconnection, in order to provide for the interval reset operation, and this duplication of parts etc. creates an excessively complex mechanism. This latter register incorporates an interval reset zero finder requiring an exceedingly large number of parts with relatively close tolerances therebetween.

An object of this invention is to provide a demand register of relatively simple configuration, driven by the meter disk but with a minimum load thereon, yet providing a high degree of accuracy of readout over a wide range, and a highly accurate and dependable return to zero.

This object is accomplished according to the present invention by the aid of improved lost motion means as well as a positive, motor driven zero reset for the maximum demand dial drive.

Additional objects and advantages of the invention will be apparent from the following description and from the drawings.

DESIGNATION OF THE DRAWINGS

DESCRIPTION OF FUNDAMENTALS

Figure 1:
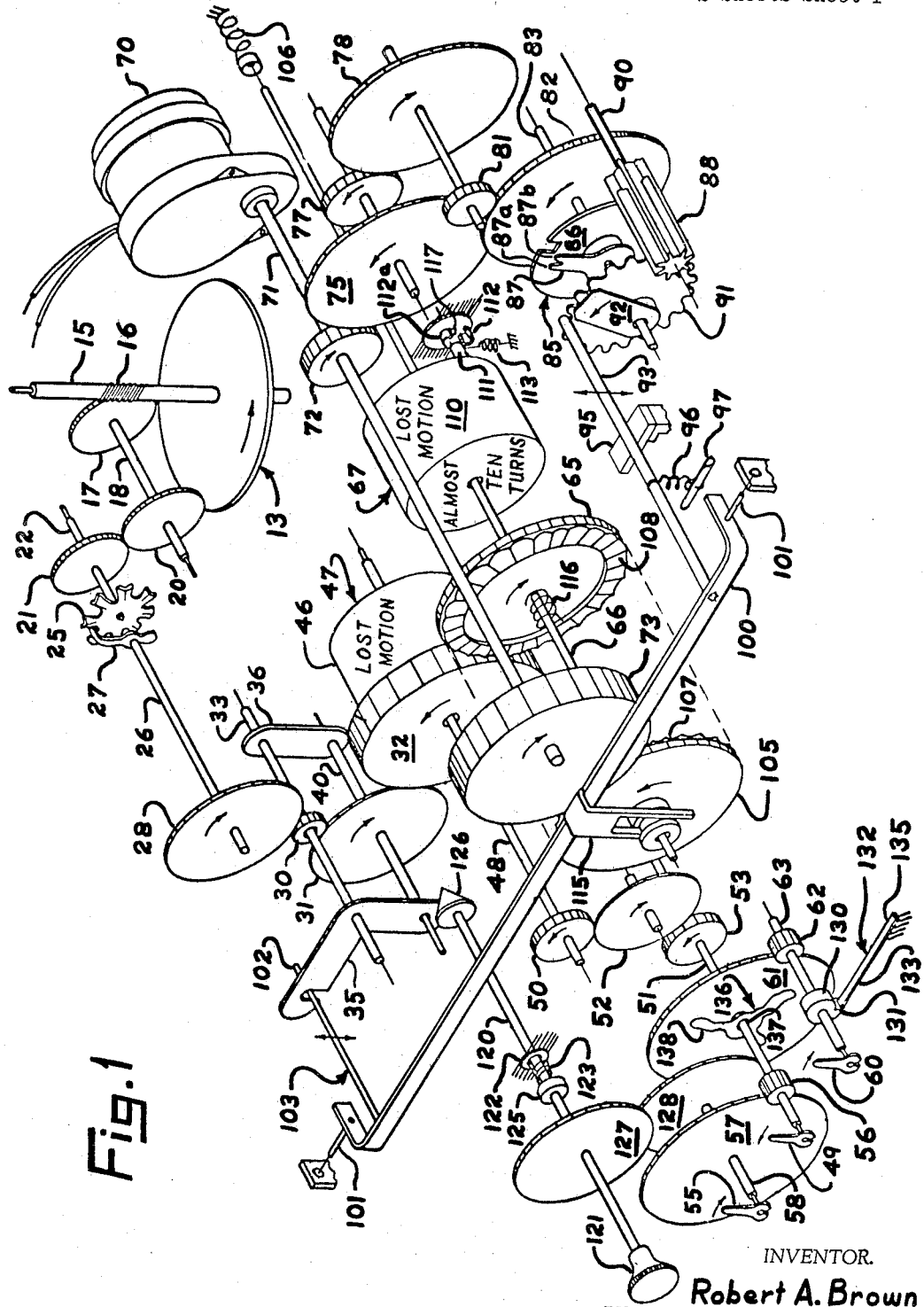
FIGURE 1 is an exploded perspective view of one form of the invention chosen for illustration, parts being elongated for clarity of illustration.

Dial indicators, such as pointers 60, 49 and 55 are the maximum demand readout indicators, each being readable along a "0" to "9" circular scale (not shown). These pointers are referred to as a decade readout because they are geared together in a 10 to 1 relationship so that if pointer 60 indicates units, pointer 49 will indicate tens and pointer 55 will indicate hundreds. Thus, the reading can be quite accurate to the nearest unit even though the reading can go as high as 999, or to tenths of a unit if the most sensitive pointer is for tenths, and the third pointer for tens. At the end of each billing period, for example once a month, the meter reader notes the reading of these pointers and then operates knob 121 to restore these pointers to zero.

After the pointers 60, 49 and 55 have been restored to zero, they will initially be driven forwardly through a gear train by rotation of the meter's disk or rotor 13. This is the same disk, which drives an additional register through another branch of the gear train, not shown, to indicate the total energy use in terms of kilowatt hours.

The initial forward drive of the pointers 60, etc. continues only through one "block interval." The duration of the block intervals, 15 minutes, 30 minutes or an hour, may be chosen by regulatory authority, and the timing devices correspondingly designed. The block intervals are timed by synchronous timing motor 70. At the end of each block interval, something must be done to restore the drive means to zero, so as to begin measurement for a new block interval, while leaving the maximum demand pointers 60, 49 and 55 at their then position. At the beginning of each successive demand interval, disk 13 again begins driving the drive mechanism, but it must not advance the pointers 60, 49 and 55 unless and until in the one interval the drive means catches up with the then indicated position of the pointers. Thereafter, until the interval is terminated by the timing motor 70, the disk 13 continues to measure the demand in each interval, advancing the pointers 60, 49 and 55 only when a new maximum demand is reached.

The present invention is concerned with providing a relatively simple and reliable mechanism for accomplishing the foregoing.

GENERAL EXPLANATION OF LOST MOTION DEVICES AND RESET

According to the present invention, the block interval reset is accomplished by a driving force derived from the timing motor 70. This is very desirable, inasmuch as such motors, although operating normally at very light load, and free from a snap action that can cause inaccuracies, can provide great increases of torque, if this should be necessary to overcome an unusual increase in friction, such as might be due to a speck of dirt in the gear train. The reset is accomplished with the aid of a pair of oppositely coupled lost motion devices 47 and 67, which, according to the preferred form of the present invention, are both of an improved multiturn form embodying the Geneva principle.

The drive from disk 13 extends to gear 32 which with cage 46 may be regarded as the "input" or "drive" or "pusher" section of lost motion device 47. The output or limit section represented by shaft 48, is permanently geared to pointer 49 so that when the pointers are returned to zero by the meter reader, the output section 46 will likewise be returned to its zero position, closing out the lost motion within the device 47. The initial driving of input section 32 will therefore advance output section 48 and the pointers. After such advance, however, the reverse driving of the input section (gear 32) by motor 70 will leave output section 48 and the pointers unaffected, merely returning the input section 32 to its zero position, thus accumulating lost motion within the lost motion device 47. The coupled lost motion device 67 determines when the zero point is reached, and causes the discontinuance of the reset drive. As motor 70 drives input gear 32 in the reverse direction, it drives input shaft 66 in a direction to close up the lost motion within lost motion device 67. As the zero point for gear 32 is reached, the lost motion and device 67 is closed up and its output or limit section 110 is moved slightly so that its pin 111 falls into a recess 117 allowing an axial shift of device 67, shaft 66 and clutch member 65, separating it from clutch member 105 to discontinue the rearward drive. Shortly thereafter, the further rotation of timing motor 70 causes re-engagement of drive gear 31 to gear 32, thereby resuming the forward drive for the start of a new block interval. As disk 13 again drives input gear 32, shaft 66 rotates equally, in effect measuring the advancing movement so as to be able to ensure that the next reset movement will be exactly equal to it.

DETAILED DESCRIPTION— INPUT GEAR TRAINS

Referring to the drawings now in more detail, the demand register (comprising most of FIG. 1) is conventionally driven by a watthour meter rotor or disk 13 which includes shaft 15 on which is formed a worm gear 16. It will be understood that the angular velocity of shaft 15 is proportional to the consumer's use of power, and this angular movement is transmitted to the register input through a simple gear train. This train is represented by gear 17 fixed on a shaft 18, gear 20 also fixed to shaft 18 driving gear 21, fixed on shaft 22, which has spoked coupling wheel 25 fixed thereon. Shafts, 15, 18 and 22 are supported by a fixed main meter frame (not shown).

The demand register includes a separate set of support plates or chassis (not shown for the purpose of clarity) in which is rotatably mounted an input drive shaft 26 fixedly carrying a dog 27 projecting at its rear end for engaging spoked wheel 25, as the register is mounted on the main meter frame. Registers are commonly assembled separately and may be easily interchanged by virtue of this connection.

Shaft 26 carries the connecting dog 27 and transmits its movement through the input gear train including gear 28, idlers 30 and 31 to gear 32. Idler gear 30 is rotatably mounted on a shaft 33. Idler gear 31 is carried by a shaft 40.

As will be described in greater detail later, shaft 40 may be swung in an arcuate path about shaft 33 so as to engage or disengage idler gear 31 from gear 32. To this end, a bell crank 35 and link 36 are coupled to comprise a swing frame as by being rigidly affixed to shaft 33, pivotally mounted in the demand register chassis.

MULTITURN GENEVA LOST MOTION DEVICES

Figure 2:
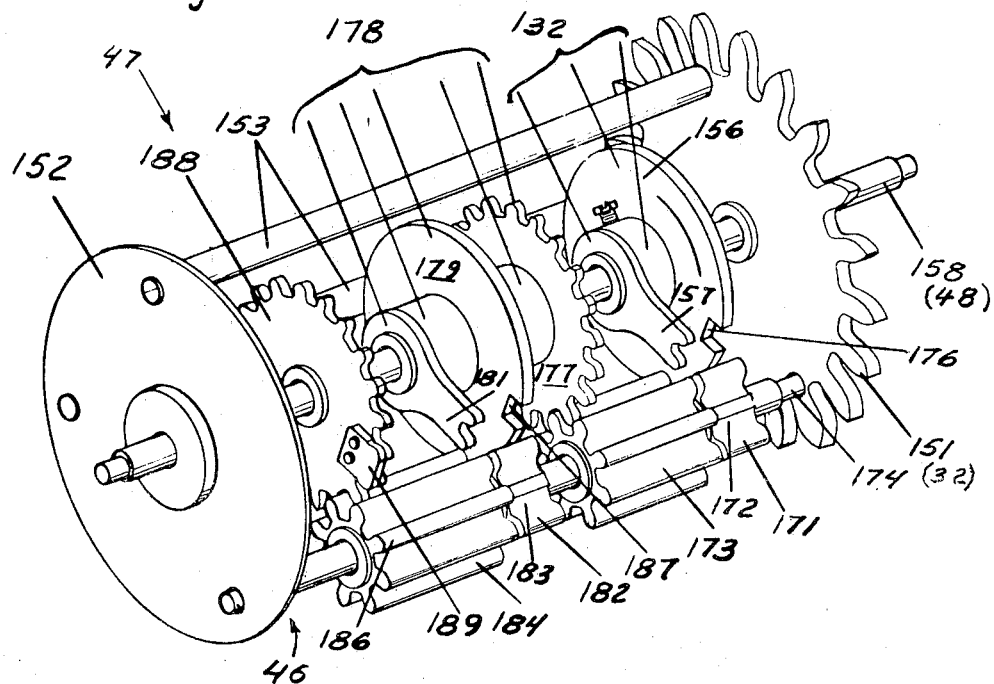
FIGURE 2 is a similar type of view on a greatly enlarged scale of one form of exponential multiturn lost motion means which may be used in the invention.

Attached to gear 32 on its rear side is the cage portion 46 of a maximum finder lost motion device 47. Although the specific configuration of such a lost motion device is shown in FIG. 2 of the drawings, a detailed description thereof will not be presented herein inasmuch as it is the subject of a copending application for Letters Patent by the same inventor as the present application. This copending application is entitled "Exponential Multiturn Lost Motion Device," and was filed Oct. 24, 1965, and has been assigned Ser. No. 505,071. Its disclosure is hereby incorporated in the present application by reference. For convenience the reference numerals used in that application have been retained, precede by a "1."

In general, exponential lost motion device 47 is extremely compact for the number of revolutions it can accommodate, and its construction minimizes the tendency toward development of error due to wear. The cage 46 is shown in FIG. 2 with the type of construction actually used, including gear 151, end plate 152, connecting rods 153 and transfer-pinion rod 174. Gear 151 corresponds to gear 32 of FIG. 1, and shaft 158 corresponds to shaft 48. If gear 151 (32) is turned forwardly (counterclockwise) slightly, stop 189 will strike tooth 186 of pinion 184, and shaft 158 (48) will then be positively driven by gear 151 (32). When stop 189 locks up with pinion 184, it causes the entire lost motion device and shaft 158 (48) to rotate as a unit, the direction of rotation being that of advancement of the readout dials. The lockup is very positive and reliably accurate because when stop 189 engages tooth 186, dog 181 is in mesh with the same pinion 184; and gear 177 and dog 157 are in mesh with their pinion 173. Pinion 183 turns with pinion 184 and has half as many teeth, and pinion 172 has the same relationship to pinion 173.

Figure 3:
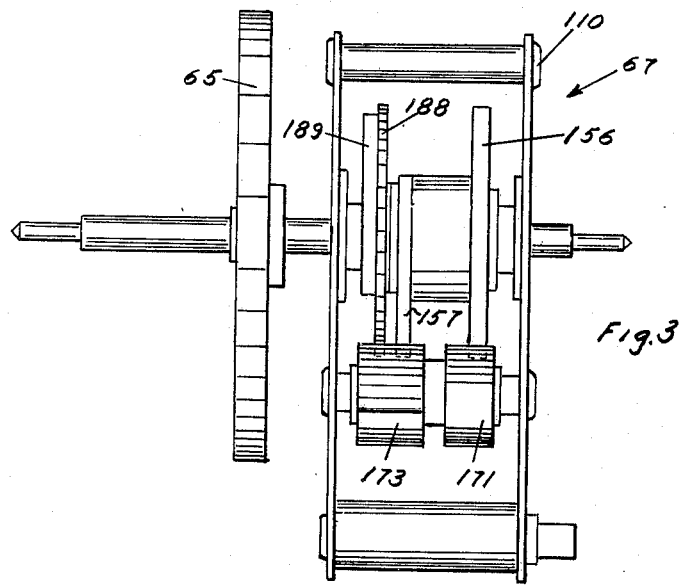
FIGURE 3 is a side view of the preferred form thereof, again on a greatly enlarged scale.

The lost motion capacity of lost motion devices 47 and 67 need be only the maximum expected for any interval, desirably approximately the amount which would run the pointers 60, 49 and 55 to full scale reading. If this requires only slightly less than ten turns of shafts 48 and 51, as in the form illustrated in FIG. 1, the intermediate stage 178 of FIG. 2 can be omitted, the form as actually used being shown, greatly enlarged in FIG. 3, the final stage gear 188 with stop 189 meshing with the same pinion 173 as does dog 157.

It is desirable for the maximum finder 67 to serve also as a maximum limit, so that pointer 55 cannot be driven quite a full turn, inasmuch as that would produce a reading of 000, followed by 001 etc. The capacity of lost motion device 47 should be at least equal to that of zero finder 67 so that it will never lock up in the reverse direction and drive the pointers downscale during interval reset. So that the maximum limit will not stop disk 11 or the kilowatt hour register, gear 28 may be provided with a friction drive, not shown. Because slippage is not part of normal operation, this slip drive may be quite stiff to provide plenty of reserve torque in the advancing drive.

The compactness of these lost motion devices is very important in demand registers where space requirements are often difficult to meet. The compactness is not readily apparent from the stretched out drawings, but might be recognized from FIG. 3, imagining it many times reduced in size.

When the rotation of gear 151 (32) is reversed such as is done at the end of an interval, stop 189 is free to move away from pinion 186 and no movement is imparted to shaft 158 (48). As will be described in greater detail later, the angular return of gear 151 (32) at the end of an interval is exactly equal to its advance during the interval.

A characteristic of the type of lost motion devices 47 and 67, as illustrated in FIG. 2, is permitting a large number of turns with relatively few parts and with a final positive lockup of a positive and dependable direct-drive nature. By "direct drive nature" is meant that the stop 189 approaches the tooth it strikes at direct drive speed and hence (in view of the relatively few contact points involved) stops with maximum positional accuracy. This is due to the Geneva type mechanism. Such mechanisms can provide exponential characteristics, in that between each two of three or more stages, the advance or more primary stage must have a certain number of revolutions to one revolution of the driven stage.

DRIVE OF DEMAND POINTERS

Shaft 48 is rotatably mounted at each end thereof in the demand register chassis, and as seen in FIG. 1, fixedly carries near its forward end a gear 50 which drives middle pointer or indicator shaft 51 by means of idler gear 52 and gear 53, the latter gear being rigidly affixed to indicator shaft 51. Middle indicator shaft 51 not only advances the "tens" pointer 49, but also advances the "hundreds" pointer 55 by means of gear 46, gear 57, and shaft 58. Similarly, shaft 51 advances the "units" dial indicator 60 by means of gear 61, gear 62, and shaft 63. It will be understood that the gear ratio between gears 56 and 57, and gears 62 and 61, are each one to ten, providing the decade or decimal relationship.

In summary, when the cage 46 of lost motion means 47 drives shaft 48, the dial indicators 49, 55, and 60 will advance proportionally to the angular movement of watthour meter element 13 which in turn rotates at a rate proportional to the rate of power consumption of the consumer.

ZERO FINDER

The precision measurement of the return movement of gear 32 to its "zero" or original position at the end of an interval is controlled by the second lost motion device 67. As gear 32 advances, it drives gear 65 which is fixedly mounted on shaft 66, this shaft being both rotatably mounted about its longitudinal axis and slightly shiftable therealong within the register chassis. Also mounted on shaft 66 is lost motion means 67 herein described as a zero finder stop that accurately keeps track of the advancement of gear 32, and during the reset operation, limits reverse rotation of gear 32 to a magnitude equal to its advancement during the immediately preceding interval. Although mounted in a manner different from that of means 47, means 67 is of substantially the same internal configuration. Its specific operation will be described later.

INTERVAL RESET DRIVE

The interval reset is accomplished by a structure including a synchronous timing motor 70 having a constantly driven output shaft 71 on which are rigidly mounted a pair of gears 72 and 73. Gear 72 is used to operate cycling means which times the interval and performs various operations between intervals. Gear 73 is used (under control of the cycling means) to drive gear 32 in a reverse direction back to its starting position in preparation for the following demand interval.

Gear 72, through speed reducing gearing 75, 77, 78, and 81 drives cycling gear 82. Gear 82 is rigidly mounted on shaft 83 which is rotatably mounted at each end thereof within the demand register chassis. Also rigidly mounted on shaft 83 for rotation therewith is a Geneva type couple 85 which includes a notched circular disk 86 and a bifurcated dog 87 having the equivalent of two teeth 87a and 87b at its outermost end. With each revolution, dog 87 engages and intermittently drives a pinion 88 having a shaft 90 mounted on a fixed axis within the demand register chassis. Between such engagements, disk 86 holds the pinion against rotation.

It will be noted that pinion 88 has half of its teeth extending over its entire length, and an additional shorter tooth between each adjacent pair of elongate teeth. A total of eight teeth is shown, but actual manufacture may be only six. When the notch in disk 86 is away from engagement with one of the teeth on the four-toothed end of pinion 88, the periphery of disk 86 is interposed between two of these teeth and thereby prevents rotation of the pinion. However, as the dog 87 moves into engagement with the eight-tooth portion of pinion 88, to drive the pinion, the notch in disk 86 moves into position to receive one of the teeth bearing on it, and permits the pinion to pivot through a two-tooth angle.

Pinion 88 is thus intermittently rotated to drive gear 91, which is rotatably mounted on shaft 83. Gear 91 carries a camming arm 92 therewith which starts and stops cycling operations between the demand intervals. As shown in FIG. 1, arm 92 is nearing the end of one revolution and is approaching a condition whereby it will cam the rear portions of an arm 93 upwardly and away from a fixed chassis stop 95 against the bias of a spring 96 attached to the chassis as at 97. Arm 93 is rigidly affixed at its forward end to a rocker bar 100, shown as a U-shaped member, which is pivotally mounted to the chassis by pivot pins 101.

Thus, movement of arm 93 rocks rocker bar 100 which in turn raises the end portions 102 of a second arm 103 affixed thereto. This, in turn, causes a resulting clockwise pivoting of bell crank 35 about its mounting shaft 33, thereby swinging idler gear 31 away from engagement with gear 32. It is therefore apparent that the input drive to gear 32 is discontinued.

As was mentioned earlier, constantly rotating shaft 71 of the timing motor continuously rotates gear 73. It drives gear 105, the latter gear being rotatably mounted on shaft 66. Shaft 66 is biased toward its forwardmost position by means of a spring 106. Gear 105 carries on its rear face one-half 107 of a clutch which is engageable at the end of an interval with its mating half 108 that is carried on the front face of gear 65. Gear 65 is rigidly mounted to shaft 66 and is in constant engagement with gear 32. Although FIG. 1, representing the parts in the midst of an interval, shows the distance between clutch portions 107 and 108 as greatly exaggerated, it will be understood that this distance is in fact quite small, the distance being increased in the figure so as not to obscure other portions of the demand register. Also mounted on shaft 66, and behind gear 65, is the zero finder stop 67.

Although the specific internal configuration of zero finder stop 67 will not be described in detail herein because it is adequately described in the aforementioned copending application, its internal configuration is substantially the same as that of lost motion means 47. Shaft 66 of the register may be deemed the same shaft as that designated 158 in FIG. 2. Longitudinal movement of shaft 66 causes zero finder 67 to be carried therewith. However, outer cage portion 110 of zero finder 67 is restrained from any great angular motion by means of a rearwardly protruding pin 111 extending rearwardly therefrom from a position near the outer edge of said cage, and this pin 111 is biased into engagement with a fixed chassis stop 112 by means of a spring 113. Lost motion devices 47 and 67 are not only connected, but are also synchronized such that the stop 189 within means 67 moves away from the shaft cage locked position as gear 32 advances from its zero position.

At the end of a demand interval when arm 92 cams arm 93 upwardly causing rocker bar 100 to pivot, a forked appendage 115 rigidly mounted thereon drives gear 105 and its attached clutch portion 107 rearwardly into driving contact with its mating half 108 against the resistive force of a compression spring 116 interposed therebetween. Inasmuch as shaft 71 rotates continuously, and gear 73 has sufficient face width to keep it in contact with gear 105 after gear 105 is moved rearwardly, gear 65 drives gear 32 in a reverse direction towards its original or zero position. This is without interference from the input drive (gear 31) since this has already been disconnected. When the zero or original starting position of gear 32 is reached, the internal stop 189 of the zero finder stop 67 will cause shaft 66 to lock with its outer cage 110; and the driving torque of timing motor 70 causes the outer cage 110 to rotate counterclockwise slightly, which moves pin 111 upwardly against the bias of spring 113 against a stop 112a which stops rotation of cage 110, shaft 66, gear 65 and gear 32. Clutch 107–108 could slip, and may start to, but pin 111 is now aligned with declutching hole 117 in the demand register chassis. The shaft 66 and parts carried therewith are therefore free to move slightly rearwardly under the bias of spring 116, this spring overcoming the lesser influence of spring 106, and the entire shaft 66 is moved slightly rearwardly carrying gear 65 and attached clutch portion 108 therewith. Therefore, clutch portions 107 and 108 are disconnected and the resetting of gear 32 to its zero position is completed.

When there has been time for the maximum amount of resetting, camming arm 92 passes beyond arm 93 of rocker bar 100, permitting the rear portions of arm 93 to move downwardly and rest on chassis stop 95 under the bias of spring 96. This movement causes member 100 to pivot which results in the following movements: (1) End portion 102 of arm 103 pivotally moves downwardly permitting bell crank 35 to pivot and cause idler gear 31 to re-engage gear 32, thereby beginning the drive of a new demand interval; (2) Forked appendage 115 moves gear 105 forwardly, releasing the rearward bias on shaft 66, and this permits spring 106 to drive shaft 66 forwardly and cause pin 111 of zero finder stop 67 to exit from hole 117 after the gear 31 engages gear 32. Although cage 110 is biased by spring 113, tending to bring pin 111 against fixed stop 112, this movement will occur only as drive gear 31 moves the parts away from the zero position.

It will be noted that during the resetting operation shaft 48 was immobile, and consequently the reading on the dial indicators was not changed. The inevitable gear and shaft friction is enough to ensure this immobility. Shaft 48 will continue to remain immobile until such time during some subsequent demand interval that the total energy consumption for that interval exceeds that which is already recorded by these dials. At this time the lost motion of maximum finder stop 47 is closed up and in its locked up condition, again by means of internal stop 189, it drives shaft 48 and advances the indicator pointers.

MANUAL INDICATOR SET BACK

At the end of a regular billing period, such as a month, the meter reader records the value of power consumption indicated by the pointers 49, 55 and 60, this value representing the maximum demand for any interval during the billing period. The reader then returns the pointers to their zero position to begin a new billing period, the operation of which will be described next.

Extending outwardly from the front of the demand register, and accessible only to the meter reader, is a shaft 120 having a knob 121 on its forwardmost end. Shaft 120 is axially shiftable and is journaled in the demand register chassis as at 122, and is biased forwardly as by spring 123 which pushes forwardly against collar 125 of shaft 120. The rearmost end of shaft 120 carries a cone-shaped biasing means 126 positioned to cause pivotal movement of bell crank 35 upon rearward movement of shaft 120 so as to disengage idler gear 31 from gear 32. At the same time, gear 127 rigidly affixed to shaft 120 engages gear 128 of indicator shaft 58 so that turning of knob 121 in the right direction causes downscale rotation of indicator dial 55. This movement is transmitted to indicator shaft 51 via gears 57 and 56, and to indicator shaft 63 via gears 61 and 62. A single lobe cam 130 is attached to "units" indicator shaft 63 for rotation therewith, this cam being free to rotate during an advancing condition of the indicator 60. However, during the zero reset operation when shaft 63 is rotated in a downscale direction, a radial flat portion 131 on the lobe of cam 130 is obstructed by a spring follower 132 having a free end 133 that rides on the cam and an opposite end 135 rigidly affixed to the demand register chassis. Thus, cam 130 is a one-tooth ratchet wheel. It, and its pawl, lever 132, are oriented in such a manner as to stop downscale rotation of indicator shaft 63 in an angular position such that the "units" indicator will read exactly "zero," and this locked condition of indicator shaft 63 also necessarily stops rotation of gears 61 and 62.

Further rotation of shaft 51 is permitted, however, by a friction spring clutch element 136, rigidly affixed to shaft 51 at its center portions 137 and bearing against gear 61 with three outwardly extending appendages 138. Therefore, further rotation of knob 121 continues to rotate indicators 49 and 55 even though indicator shaft 63 remains stationary. This resetting rotation of indicator 49 is transmitted back through gears 53, 52, and 50 causing shaft 48 to be driven in a reverse direction until internal stop 189 within means 47 causes shaft 48 to lock up with cage 46. Cage 46 and gear 32 are then driven backwardly toward the zero position of gear 32. Concurrent with the rotation of gear 32, shaft 66 is driven backwardly; and when this shaft eventually reaches its original zero position, outer cage 110 of zero finder stop 67 is locked to the shaft 66 by means of its internal stop 189 and is thereupon forced to rotate slightly away from stop 112 against the bias of spring 113 until it engages stop 117 which prohibits any further movement thereof. At this point the knob 121 is restrained from further rotation which indicates to the meter reader that the demand register has been zeroed in preparation for the start of another billing period.

It might be difficult to make units' pointer 60, driven at 10 to 1 speed, stop exactly on the zero mark of its dial by reliance on zero finder 67, but accuracy of its zero positioning, and hence a true reading at the end of the period, is achieved with the aid of one-tooth ratchet 30.

This also gives a "nice" set back action. The units pointer comes to rest in not over one turn, before reaching a screeching speed, and the slipping clutch will permit faster set back than obtainable without screeching, and at lower torque than a hurrying meter reader might apply. The ratchet is also a reserve safeguard against lowering the reading considerably if bad friction should develop in lost motion unit 47. However, the friction of the 10 to 1 geared pointer will alone hold against any friction expected in unit 47.

ACHIEVEMENT

From the foregoing, it is apparent that there has been provided a thoroughly practical, relatively simple, maximum demand register with decade readout for achieving accuracy of reading throughout a wide range of possible readings.

The preferred form of decade readout is the direct reading type, not requiring subtraction of a prior reading. A cumulator can be added, and some aspects of the invention may be useful without any direct reading decade indicator.

The interval reset has available, if needed, the full torque output of the timing motor assembly, and operates at a controlled speed which avoids impact damage or bouncing even though accomplishing the reset within eight seconds or so. Geneva type lost motion devices are provided as the maximum finder and the zero finder, with the advantages of being readily preassembled, and being quite compact and simple, and highly reliable and accurate. By using a nearly-ten-turn zero finder, it can operate in one-to-one relationship with the middle indicator of a three-indicator decade readout and provide dependable and easily achieved accuracy of the set back of that indicator to zero. Indefinite and precise accuracy of the more sensitive indicator is assured by a ratchet and pawl device which, during manual return of the pointers to zero, ensures exact accuracy of alignment of this most sensitive indicator with its zero demarcation.

I claim:
1. A maximum demand meter including
   a watt-hour meter disk;
   a set of decade-geared maximum demand indicators, drive means for the indicators, driven by the disk, including a multiturn Geneva type lost motion device through which the indicators are advanced but which permits lost motion of its input side during reset and until a new maximum demand is reached;
   a timing motor, interval reset and cycling means driven by the timing motor for resetting the lost motion device at the end of predetermined intervals to provide lost motion corresponding to return of the input side to zero; a zero finder including an additional multiturn Geneva type lost motion mechanism having driven and limit parts, with its driven part coupled to said input side to be constantly driven therewith, for stopping the interval reset motion when the input-zero condition is reached as determined by closing out of the lost motion in the zero finder in one direction, the limit of lost motion in the opposite direction being such as to stop advancement of the indicators at nearly a full scale position, means limiting the turning movement of the limit part; and
   means effective upon the reaching of the zero position for disconnecting the resetting means while the timing motor continues to drive the cycling means.

2. A maximum demand meter according to claim 1 in which the means for disconnecting the resetting means is responsive to transmission through the zero finder when lost motion therein is closed out.

3. A maximum demand register for meters including:
   a set of exponentially coupled maximum demand indicators, drive means for the indicators adapted to be driven by the meter, including a multiturn lost motion device through which the indicators are advanced but which permits lost motion of its input side during reset until a new maximum demand is reached;
   a timing motor, interval reset and cycling means driven by the timing motor for resetting the lost motion device at the end of predetermined intervals to provide lost motion corresponding to return of the input side to zero; a zero finder including an additional multiturn lost motion mechanism having driven and limit parts, with its driven part coupled to said input side to be constantly driven therewith, for stopping the interval reset motion when the input-zero condition is reached as determined by closing out of the lost motion in the zero finder in one direction, the limit of lost motion in the opposite direction being such as to stop advancement of the indicators at nearly a full scale position, means limiting the turning movement of the limit part; and
   means effective upon the reaching of the zero position for disconnecting the resetting means while the timing motor continues to drive the cycling means.

4. A maximum demand register according to claim 3 in which the means for disconnecting the resetting means is responsive to transmission through the zero finder.

5. A maximum demand register for meters including:
   a set of exponentially coupled maximum demand indicators, drive means for the indicators adapted to be driven by the meter, including a multiturn Geneva type lost motion device through which the indicators are advanced but which permits lost motion of its input side during reset until a new maximum demand is reached;
   a timing motor, interval reset and cycling means driven by the timing motor for resetting the lost motion device at the end of predetermined intervals to provide lost motion corresponding to return of the input side to zero; a zero finder including an additional multiturn Geneva type lost motion mechanism having driven and limit parts, with its driven part coupled to said input side to be constantly driven therewith, for stopping the interval reset motion when the input-zero condition is reached as determined by closing out of the lost motion in the zero finder in one direction, the limit of lost motion in the opposite direction being such as to stop advancement of the indicators at nearly a full scale position, means limiting the turning movement of the limit part.

6. A maximum demand register according to claim 5, including means effective upon the reaching of the zero position for disconnecting the resetting means while the timing motor continues to drive the cycling means.

7. A maximum demand register according to claim 6 in which the means for disconnecting the resetting means is responsive to transmission through the zero finder.

8. A maximum demand register according to claim 3 in which the drive means to at least one indicator is free from slippage in normal operation, other than the lost motion of the lost motion device, and has characteristics of positive drive and great reserve torque, and includes a disconnect device controlled by the cycling means for disconnection before the resetting action and reconnection after it.

9. A maximum demand register according to claim 5, in which the indicator set is decade-coupled and the zero finder has almost 10 turns of lost motion, and in which the other lost motion device has as much lost motion and advances at one-to-one ratio a maximum demand indicator having almost 10 turns for maximum available register indication.

10. A maximum demand register according to claim 5, in which the indicator set is decade-coupled and the zero finder has almost 10 turns of lost motion, and in which the other lost motion device has as much lost motion and advances at one-to-one ratio a maximum demand indicator having almost 10 turns for maximum available register indication; and occasional-return means for returning the indicators, the zero finder and the input side to zero after many intervals, in which the zero position of at least the one-to-one ratio indicator is determined by the zero finder; and including means independent of the zero finder for positioning accurately at zero a more sensitive maximum demand indicator.

11. A maximum demand register for meters including a set of exponentially coupled maximum demand indicators, drive means for the indicators adapted to be driven by the meter, including a multiturn lost motion device through which the indicators are advanced but which permits lost motion of its input side during reset until a new maximum demand is reached;

a timing motor, interval reset and cycling means driven by the timing motor for resetting the lost motion device at the end of predetermined intervals to provide lost motion corresponding to return of the input side to zero; a zero finder including an additional multiturn lost motion mechanism having driven and limit parts, with its driven part coupled to said input side to be constantly driven therewith, for stopping the interval reset motion when the input-zero condition is reached as determined by closing out of the lost motion in the zero finder in one direction, the lmit of lost motion in the opposite direction being such as to stop advancement of the indicators at nearly a full scale position, means limiting the turning movement of the limit part; and means for returning the indicators to zero after many intervals, including means for automatically positioning the most sensitive indicator accurately at zero independently of said lost motion devices.

12. A maximum demand indicator according to claim 11, including means for driving an indicator and the zero finder jointly until the zero finder stops the drive.

13. A maximum demand register including a set of at least three decade geared maximum demand indicators, means for advancing the indicators including a lost motion device with input and output elements, the output element being directly and invariably coupled to an indicator of intermediate sensitivity, interval reset means for resetting the lost motion device to input-zero condition at the end of predetermined intervals, occasional return means for driving the indicators in reverse including a friction drive for the most sensitive of the indicators, and ratchet means to block the reverse moton of the most sensitive indicator when it reaches its zero point, while the friction drive yields.

14. A maximum demand register according to claim 13, and including a zero-finder stopping the reset movement of the intermediate sensitivity indicator at the zero position.

15. A maximum demand register according to claim 14, in which the zero-finder is a Geneva mechanism having almost ten turns of lost motion and the coupled indicator moves in one-to-one ratio therewith and is the next to the least sensitive indicator whereby the almost ten turns of lost motion corresponds to almost one turn of the least sensitive indicator.

16. A maximum demand register according to claim 15, in which the occasional return means is manual and drives most directly the least sensitive indicator.

17. A maximum demand register for meters including maximum demand indicator means, drive means for the indicators adapted to be driven by the meter, including a multiturn Geneva type lost motion device through which the indicator means is advanced but which permits lost motion of its input side during reset and until a new maximum demand is reached;

a timing motor, interval reset and cycling means driven by the timing motor for resetting the lost motion device at the end of predetermined intervals to provide lost motion corresponding to return of the input side to zero; a zero finder including an additional multiturn Geneva type lost motion mechanism having driven and limit parts, with its driven part coupled to the said input side to be constantly driven therewith, for stopping the interval reset motion when the zero position is reached as determined by closing out of the lost motion in the zero-finder;

each of said lost motion devices including first and final Geneva stages and coupled pinion means, with the first stage holding the pinion means stationary during most of each revolution, and then turning it a partial revolution and with the final stage turned by the pinion means freely through part of one revolution, and stop means moved into stopping position by the final stage in the midst of a partial rotation of the pinion means whereby movement of the pinion means and first stage is stopped.

References Cited

UNITED STATES PATENTS

| | | | |
|---|---|---|---|
| 979,635 | 12/1910 | Aron | 324—103 |
| 2,149,410 | 3/1939 | Weisman | 324—103 |
| 2,268,494 | 12/1941 | Welcome | 324—103 |
| 2,304,596 | 12/1942 | Price | 324—103 XR |
| 2,407,369 | 9/1946 | Heynisch | 324—103 |
| 2,497,678 | 2/1950 | MacIntyre et al. | 324—103 |
| 3,092,318 | 6/1963 | Ham | 324—103 XR |

RUDOLPH V. ROLINEC, Primary Examiner

ERNEST F. KARLSEN, Assistant Examiner

U.S. Cl. X.R.

235—144